United States Patent [19]

Sekmakas et al.

[11] 4,296,011

[45] Oct. 20, 1981

[54] EPOXY ESTER COPOLYMER AQUEOUS DISPERSIONS

[75] Inventors: Kazys Sekmakas, Palatine; Raj Shah, Schaumburg, both of Ill.

[73] Assignee: DeSoto, Inc., Des Plaines, Ill.

[21] Appl. No.: 194,128

[22] Filed: Oct. 6, 1980

Related U.S. Application Data

[60] Division of Ser. No. 18,887, Mar. 9, 1979, Pat. No. 4,247,659, which is a continuation-in-part of Ser. No. 885,036, Mar. 9, 1978, abandoned.

[51] Int. Cl.$^3$ .............................................. C08L 61/06
[52] U.S. Cl. .............................. 260/29.3; 260/29.2 E; 260/29.4 R
[58] Field of Search ................... 260/29.2 E, 29.2 EP, 260/29.3, 29.4 R; 525/43

[56] References Cited

U.S. PATENT DOCUMENTS

| | | | |
|---|---|---|---|
| 3,564,074 | 2/1971 | Swisher et al. | 525/502 |
| 3,897,381 | 7/1975 | Tugukini et al. | 260/29.2 EP |
| 4,020,030 | 4/1977 | Harris et al. | 260/29.3 |
| 4,028,294 | 6/1977 | Brown et al. | 260/29.6 R |
| 4,101,398 | 7/1978 | Hesse et al. | 525/502 |

*Primary Examiner*—J. Ziegler

*Attorney, Agent, or Firm*—Dressler, Goldsmith, Shore, Sutker & Milnamow, Ltd.

[57] ABSTRACT

Water soluble epoxy ester copolymers adapted for sanitary can use comprise an hydroxy functional epoxy ester of a polyepoxide having an average molecular weight of about 300 to about 1100 and a 1,2-epoxy equivalency of about 1.4 to about 2.0, esterified with an at least approximately stoichiometric proportion, based on epoxide functionality, of monocarboxylic acid selected from benzoic acid, $C_1$-$C_8$ alkyl substituted benzoic acid, and $C_6$-$C_{10}$ alkanoic acid, the esterification reaction being continued to provide an acid number of less than 20, this hydroxy functional epoxy ester is polyesterified with from 1.5–8%, based on the weight of the epoxy ester, of a monoethylenically unsaturated dicarboxylic acid which resists homopolymerization to an acid number of less than 20, and the polyester so obtained is copolymerized with from 15% to 70% of monoethylenic monomers, based on the copolymer, these monoethylenic monomers including carboxyl functional monomer providing an acid number of from 20–100 in the copolymer. The copolymers are dispersed in water by salt formation with an amine and aminoplast or phenoplast resin is incorporated to provide curing reactivity.

13 Claims, No Drawings

EPOXY ESTER COPOLYMER AQUEOUS DISPERSIONS

The present application is a division of our prior application Ser. No. 018,887, filed Mar. 9, 1979, U.S. Pat. No. 4,247,659 which, in turn, is a continuation-in-part of our prior Application Ser. No. 885,036, filed Mar. 9, 1978, now abandoned.

TECHNICAL FIELD

The present invention relates to water soluble epoxy ester copolymers which are particularly adapted to sanitary can use where good resistance to extraction by hot water and good odor and flavor characteristics are essential.

BACKGROUND ART

Water solution coating compositions have been employed for diverse purposes, but it has been difficult to obtain the good resistance to extraction by hot water and good odor and flavor characteristics which are important to enable application of the coatings to sanitary use.

DISCLOSURE OF INVENTION

In this invention, a relatively low molecular weight polyepoxide having an average molecular weight of about 300 to about 1100 (by calculation) and a 1,2-epoxy equivalency of about 1.4 to about 2.0 is esterified with an at least approximately stoichiometric proportion, based on epoxide functionality, of monocarboxylic acid selected from benzoic acid, a $C_1$-$C_8$ alkyl substituted benzoic acid, or a $C_6$-$C_{10}$ alkanoic acid to produce an ester derivative substantially free of epoxy functionality. This esterification reaction is continued to an acid number of less than 20. The resulting hydroxy functional epoxy ester is then polyesterified with a monoethylenic dicarboxylic acid which resists homopolymerization, preferably fumaric acid. From 1.5–8% of the diacid is used in the polyesterification reaction, based on the weight of the epoxy ester, so the hydroxy groups in the epoxy ester are present in stoichiometric excess, and the polyesterification is continued to an acid number of less than 20 to provide an ethylenically unsaturated hydroxy functional polyester. This unsaturated polyester is then copolymerized with from 15% to 70% of monoethylenic monomers, based on the weight of the copolymer, to provide a copolymer product. These monomers include monoethylenic carboxylic acid, such as methacrylic acid or fumaric acid, to provide an acid number of from 20–100 in the final copolymer so that amine and water can be added to provide a water dispersion which is either a solution or a colloidal dispersion. Reactive monomers, such as hydroxyethyl acrylate or N-methylol acrylamide or its ether, such as the butyl ether, may be used. Alternatively, an aminoplast, such as hexamethoxy methyl melamine, or a water soluble or dispersible phenoplast, or a mixture thereof, may be used for cure.

The polyepoxides preferably have a 1,2-epoxy equivalency of about 1.4 to about 2.0 and the best properties are obtained using diglycidyl ethers of a bisphenol, such as bisphenol A. The preferred molecular weight of the polyepoxides, which may be provided by the use of mixtures, is from 350 to 800.

The saturated monocarboxylic acid used to consume the epoxy functionality may be benzoic acid or a $C_1$–$C_8$ alkyl substituted benzoic acid or a $C_6$–$C_{10}$ alkanoic acid, but para tertiary butyl benzoic acid is particularly preferred. The $C_6$–$C_{10}$ alkanoic acids are less preferred and are illustrated by hexoic acid or pelargonic acid. These saturated monocarboxylic acids uniquely provide maximum impermeability in the combination of this invention.

The esterification reaction is wholly conventional, simple heating to a hot melt, desirably in the presence of a trace of amine catalyst, being all that is needed. The acid is used in at least approximately stoichiometric proportion and the reaction is continued to consume most of the acid, an acid number of less than about 20, preferably less than 10, being contemplated.

Significant residual epoxy functionality yields instability and should be avoided. Some excess acid will simply react with the hydroxy functionality on the epoxy ester. It is here noted that polyepoxides frequently contain hydroxy groups, and even if they do not, the carboxy-epoxy reaction produces hydroxy groups, so the epoxy ester which is formed is hydroxy functional. Substantially stoichiometric proportions are preferred.

The monoethylenically unsaturated dicarboxylic acid should resist homopolymerization so that its acidity can be substantially consumed in the production of a polyester with the hydroxyl functional epoxy ester without consuming the unsaturation. The preferred dicarboxylic acid is fumaric acid, but maleic acid or maleic anhydride can also be used. An acid number of less than 20, preferably less than 10, indicates the desired complete reaction.

This polyester now contains polymerizable unsaturation and it is copolymerized with monoethylenic monomers, the bulk of which (at least about 50% by weight) are nonreactive. This means that, aside from their polymerizable unsaturation, they do not react under the conditions of polymerization and use which are contemplated. A similar statement is that there are no functional groups except the polymerizable ethylenic group. Styrene and vinyl toluene are particularly contemplated, though methyl methacrylate, methyl acrylate, ethyl acrylate, acrylonitrile and vinyl acetate will further illustrate the useful materials. Styrene and vinyl toluene are especially important for two reasons. First, they copolymerize better with the dicarboxylic acids used for polyesterification. Second, they produce higher molecular weight copolymers which provide higher viscosity aqueous solutions at low solids content, and this provides spray solutions which better resist the formation of bubbles, blisters and foams.

A monoethylenic carboxylic acid of any desired type should be employed to provide an acid number of from 20–100 in the final copolymer. Fumaric acid and maleic acid are preferred because these are F.D.A. approved, but acrylic acid, methacrylic acid, crotonic acid and itaconic acid are all useful, and one cannot know which acids will be approved for sanitary can use in the future. Maleic anhydride is useful at the smaller proportion of use. The preferred acidity should not exceed 60. While more acid polymers can be used, sanitary can use requires maximum water resistance and good resistance to water extraction, and these are best at low acid value. The copolymers herein are well adapted to disperse in water at low acid value.

Other reactive monoethylenic monomers may be included in an amount up to about 20% of the total polymerizable monomers. These are illustrated by hydroxy monomers, such as 2-hydroxyethyl acrylate, amide monomers, such as acrylamide, N-methylol functional monomers, such as N-methylol acrylamide or ethers thereof like the butyl ether.

The copolymerization is itself conventional being carried out in organic solvent solution using a free radical generating polymerization catalyst. These are well known and are illustrated in the Example.

The aminoplast and phenoplast resins which may be used for cure are also well known and will be illustrated by hexamethoxymethyl melamine. This class of water soluble and water dispersible materials useful for curing hydroxy functional resins is a matter of common knowledge in the art. They are used in an amount of 5–40% of total resin solids.

An amine, including ammonia, is added to allow the acidic copolymer to be dispersed in water. This is again conventional, and is illustrated using dimethyl ethanol amine.

The resulting aqueous solutions cure to provide films characterized by superior resistance to extraction and they resist absorbing odor and flavor components of the foods and beverages which are packaged. They can be applied to any metal can interior, such as aluminum, steel and tin plated steel. Spray application and cure by baking at 400° F. for 3 minutes are particularly contemplated. Films of about 0.2–0.3 mil are formed. Good adhesion is obtained on all of these surfaces.

BEST MODE FOR CARRYING OUT THE INVENTION

The invention is illustrated in the following example of preferred operation, all parts herein being by weight except where otherwise noted.

EXAMPLE 1

| (1) | Para tertiary butyl benzoic acid | 210 |
|---|---|---|
|   | CIBA 6010 | 230 |
|   | Heat to 100° C. to melt. | |
| (2) | Dimethyl ethanol amine | 1 |
|   | Add (2). Watch for exotherm which heats the mixture to 225° C. and hold for acid value less than 5. Then cool to 180° C. | |
| (3) | Fumaric acid | 15 |
|   | Xylol | 30 |
|   | Add (3). Heat to 225° C. and remove water of esterification and hold for acid value less than 7. Cool to 170° C. | |
| (4) | Butyl cellosolve | 460 |
| (5) | Fumaric acid | 40 |
|   | Add (4) and (5). Hold 30 minutes to dissolve the fumaric acid and then cool to 125° C. | |
| (6) | Styrene | 160 |
|   | Cumene Hydroperoxide | 25 |
|   | Premix (6) and add over 2 hrs. at 125° C. and hold 1 hr. | |
| (7) | Cumene hydroperoxide | 5 |
|   | Add (7) and hold 1 hr. | |
| (8) | Cumene hydroperoxide | 5 |
|   | Add (8) hold 1 hr., and cool to 70° C. | |
| (9) | Dimethyl ethanol amine | 75 |
| (10) | Hexamethoxymethyl melamine | 165 |
|   | Add (9) and (10) | |
| (11) | Deionized water | 1400 |
|   | Add (11) slowly over 30 minutes. | |

The final product is a milky dispersion having the following characteristics: Nonvolatile solids—30.1%; Acid value of solids—33.5

This dispersion has been successfully sprayed on aluminum and steel can interiors and cured by baking at 400° F. for 3 minutes. Extractables are low and good flavor and color properties are obtained.

We claim:

1. Epoxy ester copolymer soluble in water with the aid of an amine comprising the hydroxy functional epoxy ester of a polyepoxide having an average molecular weight of about 300 to about 1100 and a 1,2-epoxy equivalency of about 1.4 to about 2.0, esterified with an at least approximately stoichiometric proportion, based on epoxide functionality, of monocarboxylic acid selected from benzoic acid, $C_1$–$C_8$ alkyl substituted benzoic acid, and $C_6$–$C_{10}$ alkanoic acid, the esterification reaction being continued to provide an acid number of less than 20, said hydroxy functional epoxy ester being polyesterified with from 1.5–8%, based on the weight of the epoxy ester, of a monoethylenically unsaturated dicarboxylic acid which resists homopolymerization to an acid number of less than 20, and said polyester being copolymerized with from 15% to 70% of monoethylenic monomers, based on the copolymer, said monoethylenic monomers including carboxyl functional monomer providing an acid number of from 20–100 in the copolymer, said copolymer being dispersed in water in the form of a salt with an amine.

2. Epoxy ester copolymer as recited in claim 1 in which said polyepoxide has an average molecular weight of from 350 to 800.

3. Epoxy ester copolymer as recited in claim 2 in which said polyepoxide is a diglycidyl ether of a bisphenol.

4. Epoxy ester copolymer as recited in claim 1 in which said monocarboxylic acid is para tertiary butyl benzoic acid.

5. Epoxy ester copolymer as recited in claim 1 in which said hydroxy functional epoxy ester is polyesterified with from 2.5–5%, based on the weight of the epoxy ester, of said unsaturated dicarboxylic acid.

6. Epoxy ester copolymer as recited in claim 1 in which said polyepoxide and said monocarboxylic acid are used in substantially stoichiometric proportions.

7. Epoxy ester copolymer as recited in claim 1 in which said unsaturated dicarboxylic acid is fumaric acid.

8. Epoxy ester copolymer as recited in claim 7 in which said carboxyl functional monomer is also fumaric acid.

9. Epoxy ester copolymer as recited in claim 1 in which at least 50% of said monomers are nonreactive.

10. Epoxy ester copolymer as recited in claim 9 in which said nonreactive monomers consist of styrene and vinyl toluene.

11. Epoxy ester copolymer as recited in claim 9 in which the functionality of any nonacidic reactive monomer is selected from the group consisting of hydroxy, amide and N-methylol amide.

12. Epoxy ester copolymer as recited in claim 1 in which said copolymer is present in admixture with from 5–40%, based on total resin solids, of an aminoplast or phenoplast resin.

13. Epoxy ester copolymer as recited in claim 1 in which said copolymer has an acid number of up to about 60.

* * * * *